United States Patent
Agarwal et al.

(10) Patent No.: US 10,609,155 B2
(45) Date of Patent: Mar. 31, 2020

(54) SCALABLE SELF-HEALING ARCHITECTURE FOR CLIENT-SERVER OPERATIONS IN TRANSIENT CONNECTIVITY CONDITIONS

(71) Applicant: International Business Machines Corporation, Armonk, NY (US)

(72) Inventors: Kanak B. Agarwal, Austin, TX (US); Patrick J. Bohrer, Cedar Park, TX (US); Ahmed Gheith, Austin, TX (US); Michael D. Kistler, Austin, TX (US); Ramakrishnan Rajamony, Austin, TX (US); Brian L. White Eagle, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 521 days.

(21) Appl. No.: 14/627,182

(22) Filed: Feb. 20, 2015

(65) Prior Publication Data

US 2016/0248836 A1    Aug. 25, 2016

(51) Int. Cl.
H04L 29/08    (2006.01)
(52) U.S. Cl.
CPC ........ *H04L 67/146* (2013.01); *H04L 67/1027* (2013.01)
(58) Field of Classification Search
CPC .............. G06Q 10/06; G06Q 10/0631; G06Q 10/06316; G06Q 30/0633; G06Q 10/0833; G06F 17/30557; G06F 17/30914; G06F 17/3089; G06F 2209/5015; H04L 67/1027; H04L 67/146; H04L 67/02; H04L 67/28; H04L 67/16; H04L 67/26;
(Continued)

(56) References Cited

U.S. PATENT DOCUMENTS 5,999,964 A    12/1999 Murakata et al.
6,557,056 B1*   4/2003 Lanteigne ............... G06F 9/466
                                                        710/52
(Continued)

FOREIGN PATENT DOCUMENTS

WO    2004072800 A2    12/2004
WO    2012156851 A1    11/2012

*Primary Examiner* — Jason D Recek
*Assistant Examiner* — Ranjan Pant
(74) *Attorney, Agent, or Firm* — Garg Law Firm, PLLC; Rakesh Garg; Brian Welle

(57) ABSTRACT

A method, system, and computer program product for scalable and self-healing architecture for client-server operations in transient connectivity conditions are provided in the illustrative embodiments. An application in a second system receives a request from a first system, the request requesting data from a type of service. A first response responds to the request. The request is queued in a service queue corresponding to the type of the service, to make the request available to a third system that provides the type of the service. A notification is received that a second response from the third data processing system has been posted into a session specific queue, the second response being responsive to the request. In response to another request received from the first system, a third response is sent to the first system, the third response including the data from the second response from the session specific queue.

18 Claims, 12 Drawing Sheets

(58) Field of Classification Search
CPC ........... H04L 29/12783; H04L 41/5003; H04L 47/125; H04L 47/2408; H04L 49/3045; H04L 67/1002; H04L 67/1063
See application file for complete search history.

(56) References Cited

U.S. PATENT DOCUMENTS

| | | | |
|---|---|---|---|
| 6,823,456 B1 | 11/2004 | Dan et al. | |
| 7,363,342 B1* | 4/2008 | Wang | H04L 67/02 709/204 |
| 7,415,470 B2 | 11/2008 | Kasamsetty et al. | |
| 7,739,391 B2* | 6/2010 | Marais | G06F 9/546 709/227 |
| 7,974,966 B2* | 7/2011 | Robie | G06F 9/542 707/713 |
| 8,566,402 B2 | 10/2013 | Cullen | |
| 8,667,505 B2* | 3/2014 | Woods | G06F 11/0718 719/314 |
| 8,799,400 B2 | 8/2014 | Watte | |
| 9,021,046 B2* | 4/2015 | Mayo | G06F 9/5077 709/213 |
| 9,652,310 B1* | 5/2017 | Graham | G06F 9/546 |
| 9,843,531 B2* | 12/2017 | Perreira | G06F 9/4843 |
| 2002/0143598 A1* | 10/2002 | Scheer | G06Q 10/06 705/7.26 |
| 2003/0163761 A1 | 11/2003 | Chen | |
| 2005/0144277 A1* | 6/2005 | Flurry | G06F 17/3089 709/225 |
| 2006/0155894 A1* | 7/2006 | Pennington | G06F 9/546 710/52 |
| 2007/0156869 A1* | 7/2007 | Galchev | G06F 9/505 709/223 |
| 2008/0256553 A1* | 10/2008 | Cullen | G06Q 30/02 719/313 |
| 2009/0048891 A1* | 2/2009 | Ottavi | G06Q 10/06316 705/7.26 |
| 2012/0278473 A1* | 11/2012 | Griffiths | G06F 17/30194 709/224 |
| 2013/0111500 A1* | 5/2013 | Dixon | G06F 9/546 719/314 |
| 2013/0138737 A1* | 5/2013 | Banks | H04L 67/02 709/204 |
| 2014/0098758 A1* | 4/2014 | Cheng | H04L 47/10 370/329 |
| 2014/0149485 A1* | 5/2014 | Sharma | H04L 67/142 709/202 |
| 2014/0280852 A1* | 9/2014 | Griffiths | G06F 17/30194 709/223 |
| 2015/0026237 A1* | 1/2015 | Kaplinger | H04L 67/1095 709/203 |
| 2015/0163179 A1* | 6/2015 | Maes | G06F 9/546 709/206 |
| 2015/0295844 A1* | 10/2015 | Perreira | G06F 9/4843 709/226 |

* cited by examiner

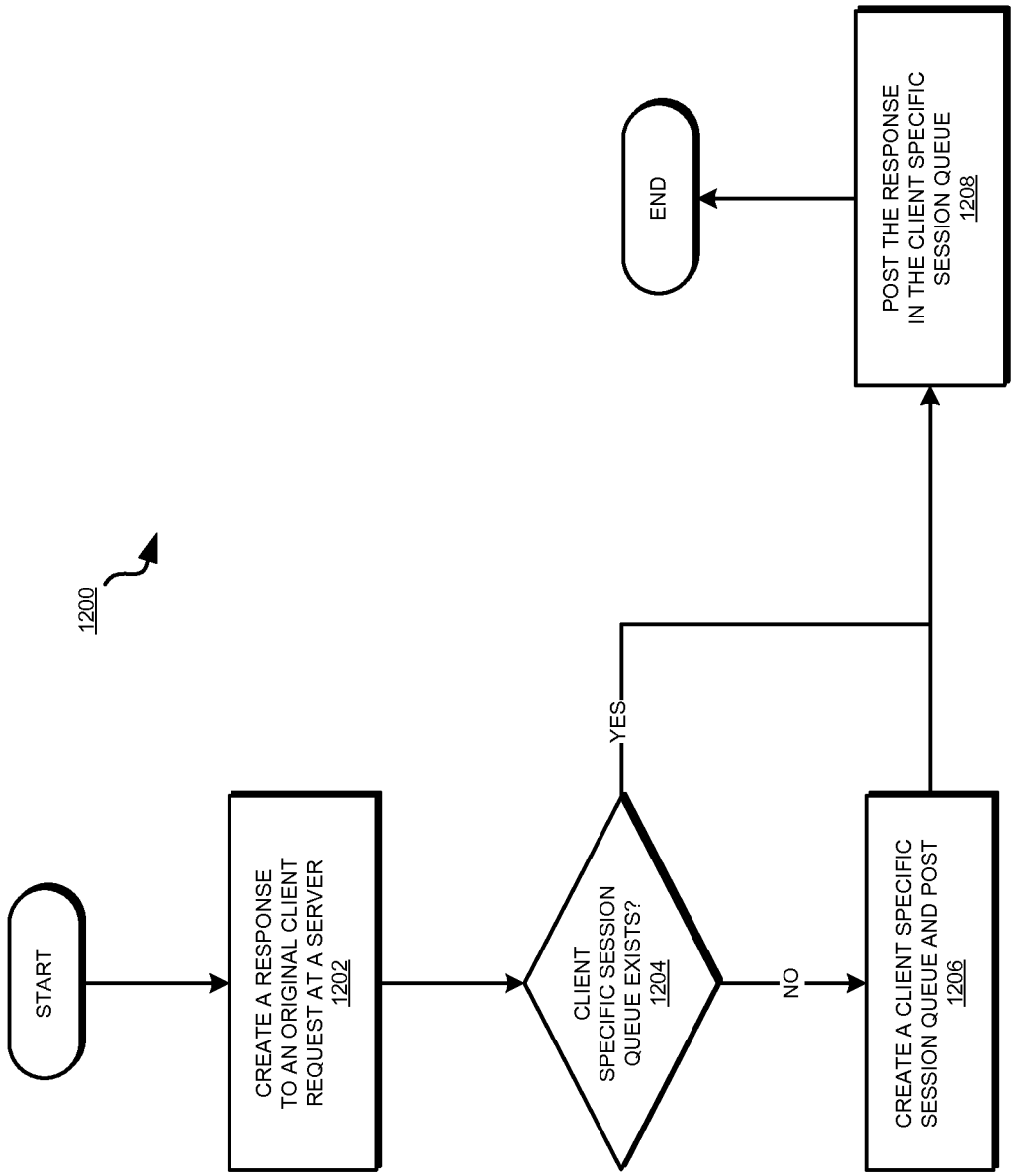

SCALABLE SELF-HEALING ARCHITECTURE FOR CLIENT-SERVER OPERATIONS IN TRANSIENT CONNECTIVITY CONDITIONS

TECHNICAL FIELD

The present invention relates generally to a method, system, and computer program product for managing data requests and responses. More particularly, the present invention relates to a method, system, and computer program product for scalable and self-healing architecture for client-server operations in transient connectivity conditions.

BACKGROUND

Most data communications between two data processing systems involve a request for data and a response containing the requested data. For example, a client data processing system requests data by sending a request message using HyperText Transfer Protocol (http or HTTP) to a server data processing system. The server sends, using http, a response message containing the data to the client.

An underlying assumption in such data communications is that the data network over which the messages are communicated will remain available throughout the message exchange. When a client requests data and the network changes or becomes unavailable, the client has to re-request the data by sending another request.

Users are well aware of such situations in mobile environments. For example, assume that an application executing on a mobile device requests data from a server over the mobile network while the mobile device is moving through the mobile network. While the application is awaiting the data, the mobile network connectivity may be lost due to weak or absent signal in some areas, the network parameters may change as the device transits from one mobile network to another network, or some other change or transiency in the data connectivity may occur in the network causing the device to temporarily become unable to receive a response to the request for data.

When the mobile device regains connectivity to a data network, the application does not simply begin receiving the data that was requested before the transiency of the data connectivity was experienced. One example reason why this may occur is because the response may be discarded when the time between the request and the response exceeds certain thresholds. The application may therefore have to re-request the data and obtain the response without losing the network connectivity.

Furthermore, from a server's point of view, managing the requests from numerous clients is also problematic under such transient network circumstances. Often a server has to duplicate the work to regenerate the requested data, reproduce the response, or both, when request retransmissions occur due to disruptions in network connectivity.

Under some circumstances, the requesting application, the client data processing system, or both may no longer be available to receive the requested data. Under such circumstances, the requested data lingers at the server or elsewhere in the data network.

SUMMARY

The illustrative embodiments provide a method, system, and computer program product for scalable and self-healing architecture for client-server operations in transient connectivity conditions. An embodiment includes a method for managing data requests in transient network conditions. The embodiment receives a first request from a first data processing system, over a data network, at an application executing using a processor and a memory in a second data processing system, the first request requesting data from a type of service. The embodiment responds to the first request with a first response. The embodiment queues the first request in a service queue corresponding to the type of the service, to make the first request available to a third data processing system that provides the type of the service. The embodiment receives a notification that a second response from the third data processing system has been posted into a session specific queue, the second response being responsive to the first request. The embodiment sends, in response to a second request received from the first data processing system, a third response, the third response including the data from the second response posted in the session specific queue.

Another embodiment includes a computer usable program product comprising a computer readable storage device including computer usable code for managing data requests in transient network conditions.

Another embodiment includes a data processing system for managing data requests in transient network conditions.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 12 depicts a flowchart of another example process for scalable and self-healing architecture for client-server operations in transient connectivity conditions in accordance with an illustrative embodiment.

DETAILED DESCRIPTION

Figure 1:
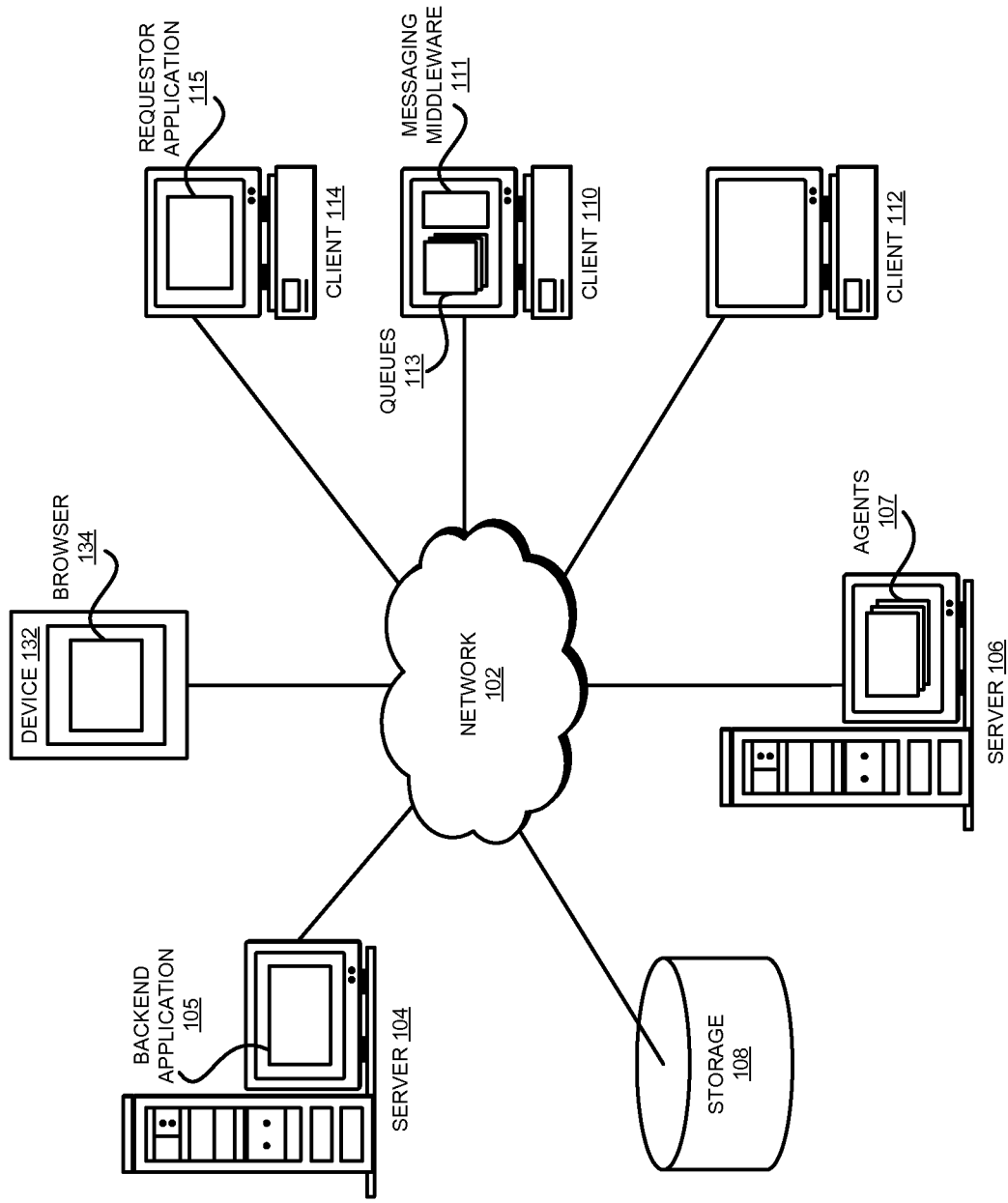
FIG. 1 depicts a block diagram of a network of data processing systems in which illustrative embodiments may be implemented.

The illustrative embodiments recognize that managing requests and responses in transient network environments is problematic from the perspective of the requesting data processing systems as well as the responding data processing systems. On the requestor data processing system side, the problems present themselves as unsuccessful requests for data, repeated requests, and latency in receiving the data, among other undesirable operations and user experience. On the responder data processing system side, the problems present themselves as multiple requests for the same data, different servers receiving the copies of the request and performing duplicative work to generate the responses, languishing data when requestors remain inaccessible for a period of time, among other undesirable operations and expenses.

The illustrative embodiments used to describe the invention generally address and solve the above-described problems and other problems related to managing data requests and responses. The illustrative embodiments provide a method, system, and computer program product for scalable and self-healing architecture for client-server operations in transient connectivity conditions.

Hereinafter, only for the clarity of the description and without implying any limitation thereto, some illustrative embodiments are described using http requests and responses in a mobile computing environment. The embodiments described herein are adaptable to other types or requests and responses using other protocols. The embodiments described herein are also adaptable for use not only with mobile devices but also with other data processing system and environments where stable network connectivity is not guaranteed.

In some embodiments, a requestor system is described as a client and a responding system is described as a server without implying any particular client-server configuration or architecture. A client is simply a consumer of data and a server is simply a supplier of data, and a system that is a client in one exchange could very well be the server (or backend) in another exchange, and vice versa. Typically, servers operate in a backend data processing environment and are accessed over a data network from applications executing at client systems. The backend data processing environment—also referred to herein as the server-side data processing environment—comprises applications and systems to receive the data requests, repositories of data from which to provide data in response, applications whose services are requested in some requests, security applications, middleware applications and platforms, and many other systems and applications.

An embodiment can be implemented as an application in software, hardware, or firmware, to operate in the backend data processing environment. An application implementing an embodiment is referred to herein as an agent. Some operations of some embodiments described herein can be implemented in a server, such as by modifying a server application to perform those operations. Generally, within the scope of the illustrative embodiments, the operations and functions of an embodiment can be implemented in a stand-alone manner or in conjunction with other applications executing in the backend data processing environment.

A client initiates a data communication session by sending a handshake message to a backend data processing environment. The backend data processing environment implements one or more agent applications, one of which establishes a session identifier for the session and responds to the client's handshake message. For the remainder of the data communications between the client and the backend, the client is expected to use the session identifier.

Using the session identifier, the client sends a request, such as a request for data, to the backend data processing environment. Before a server in the backend environment can respond to the request, or even before the request is directed to a specific server for processing, an agent responds to the request with an acknowledgement (ACK message), thereby indicating to the client that the request has been received for processing. An example protocol used for such communications may be, but is not limited to HTTP.

The agent determines from the message header a type of service the request message is requesting. For example, one request may ask for a database service where a database has to provide data in response. As another example, another request may ask for an identity service where a server application may have to validate an identity and provide confirmatory data. As another example, a request may ask for a notification service where a backend application has to supply information of an event when the event is detected. Many other types of services can similarly be requested from the backend in a request message.

A message-oriented middleware is any suitable application that enables two or more applications to communicate with each other via message queues (MQ). A variety of message-oriented middleware, also referred to herein as messaging middleware or MQ middleware, are presently available and in use in backend data processing environments. MQ-Series and RabbitMQ are some examples of commercially available messaging middleware that facilitate such communications between applications (MQ-Series is a trademark of International Business Machines Corporation in the United States and other countries, RabbitMQ is an open source software distributed by Pivotal Software, Inc., under Mozilla Public License).

A messaging middleware allows one or more applications to publish one or more messages for one or more other applications in a message queue. The other applications subscribe to the queue. When a message is published to the queue, all subscribers, or a subset of the subscribers, to the queue can receive the published message. The subset of subscribers that receive a message is determined by a combination of the policies ascribed to the queue and by the message contents themselves.

The set of one or more agent applications maintain a set of service queues. A service queue in the set of service queues is configured to receive publications of requests of only a specific service. For example, one service queue may be associated with the database service, another service queue may be associated with the identity service, and another service queue may be associated with the notification service.

Depending upon the service being requested in a request message, an agent publishes the request to the service queue associated with that service. Those servers or backend applications which provide the requested service subscribe to the service queue for that service. One of the subscriber backend applications takes up the request from the service queue. That subscriber backend application processes the request and produces a response with the requested data.

Meanwhile, from the client's point of view, the original request-ACK pair may have concluded. The request and the ACK occur in a considerably shorter period as compared to the time it would take to respond to the request with the requested data.

The client must open another channel for the session over which data from the backend can be received. Under http, the client accomplishes this operation by sending a GET message to the backend. In other protocols, the same underlying transport may be used to send responses to the client.

The original request from the client and the response received by the client are decoupled in several ways. For example, the response may be sent by an agent that is different from the agent that processed the request. As another example, the response may be sent at a time that is different from the time of the request. As another example, there may even be multiple response messages sent in response to the same original request.

An agent receives the client message asking for response(s), which includes the session identifier. Under HTTP, this message may be sent as a GET request. As explained previously, the agent receiving this message may be different from the agent that received the original client request. The agent determines whether a session specific queue for the requestor client has already been created in the messaging middleware. A session specific queue is usable by a server to publish responses that have to be delivered to the client. Whenever a server or backend application has data to send to the client, the server or the backend application publishes that data to the session specific queue for the client. The client is the ultimate subscriber to the session specific queue with the agent acting as the intermediary who will forward the message. When data is published to the session specific queue, the subscribing client receives the data when the client has data connectivity.

In certain circumstances, such as when the client loses connectivity for a prolonged period after sending the initial request for data, the client may not have opened a channel before the server is ready to publish a response. Because the channel has not been opened, a session specific queue does not yet exist to which the server can publish the response. In such circumstances, the server can create the session specific queue and publish the response to the queue.

In some cases, a client may open multiple channels or the like, such as by sending multiple HTTP GET messages. Potentially different agents can receive the different requests from the same client for the same session. To avoid creating multiple session specific queues for the same session for the same client, before an agent creates a session specific queue, the agent checks whether a session specific queue already exists for the client and the session identifier. If a session specific queue already exists, the agent simply binds to the existing session specific queue.

Thus, multiple agents can bind to the same session specific queue. When a response is posted to the session specific queue by a server or backend application, any one of the agents that are bound to the queue can send the published response to the subscribing client as a response to the client-initiated "receive response" message. Under HTTP, this may be a GET message. Which of the several bound agents sends the GET response message to the subscribing client can be selected using any suitable method of selecting one entity from many comparable entities. Load balancing, relative priorities, an order of identifiers, and round robin are some example methods for such a selection.

When a subscribing client does not access a session specific queue for a queue timeout period, an embodiment purges the queue and the remaining messages therein. If a message is posted to a session specific queue, and a subscribing client does not pick up or receive the posted message, a message timeout timer purges that posted message from the session specific queue.

Thus, the architecture self-heals from prolonged lost connectivity, terminated clients, abandoned requests, and other such circumstances. The example architecture according to an embodiment described above also allows a backend configuration of servers to scale according to the number of unique requests rather than according to a mix of unique and duplicative requests. Thus, the backend resources also experience a far more productive utilization as compared to the present wasteful utilization for processing duplicative requests.

The data responsive to the request is delivered over a publish-subscribe model using message queues, which do not require request-response pairs. Therefore, the client avoids having to re-send requests due to transient network conditions but is still able to receive the responses as and when the client has connectivity.

A method of an embodiment described herein, when implemented to execute on a device or data processing system, comprises substantial advancement of the functionality of that device or data processing system in managing data requests and responses. For example, in order to manage data communications over intermittent network connectivity, the prior-art requires repeated retransmission of requests from the client to the server, the retransmissions ending when the network connectivity is stable for a long enough period to allow the server's response to reach the requesting client. In contrast, an embodiment allows a client to receive at least an acknowledgement response almost immediately upon an initial request, obviating the need to retransmit even if network connectivity is lost thereafter. The client can then pick up the response via a publish subscribe mechanism as and when the network connectivity becomes available to the client. Such manner of data request management in transient network conditions is unavailable in presently available devices or data processing systems. Thus, a substantial advancement of such devices or data processing systems by executing a method of an embodiment allows for better scaling of the backend capacity, a self-healing mechanism to handle long term disconnects between the requestors and the responders, and significantly reduces the need to retransmit data requests in unstable networks.

The illustrative embodiments are described with respect to certain architectures, middleware, protocols, messages, identifiers, networks, parameters, timeouts, conditions, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures thereof, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
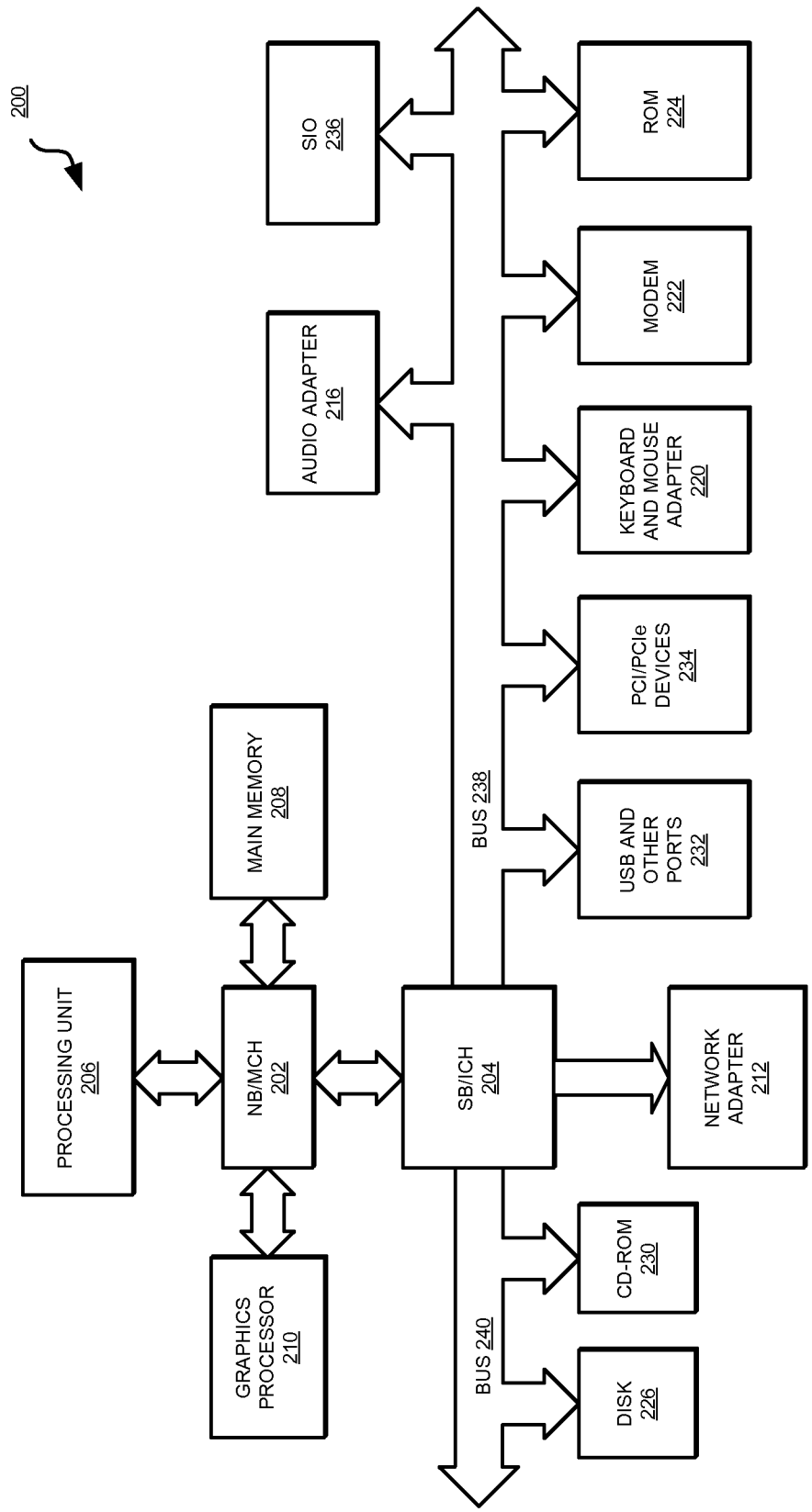
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Backend application 105 in server 104 comprises any application, including but not limited to a server application or a service application, which responds to a request from a client application. Device 132 is a non-limiting example of a client, and browser 134 in device 132 is a non-limiting example of a client application. Requestor application 115 in client 114 is another example of a client application. Requestor application 115 or browser 134 sends a request to which backend application 105 responds. One or more agent applications 107 in server 106 receive the request from client application 115 or 134, queue the request according to the type of service requested, create session specific queues, and pass responses to a client application 115 or 134 as described elsewhere in this disclosure. In one embodiment, backend application 105 is modified to create a session specific queue as described herein. Messaging middleware 111 provides the queuing and publish-subscribe functionality to agents 107 for this purpose in the manner described elsewhere in this disclosure. For example, messaging middleware 111 facilitates the creation and operation of queues 113. A queue in queues 113 may be a service queue, and another queue in queues 113 may be a session specific queue.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also be viewed as employing a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

Data processing system 200 is also representative of a data processing system or a configuration therein, such as device 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive or solid-state drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as agents 107 or backend application 105 in FIG. 1 are located on storage devices, such as hard disk drive 226 or a solid-state data storage device, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
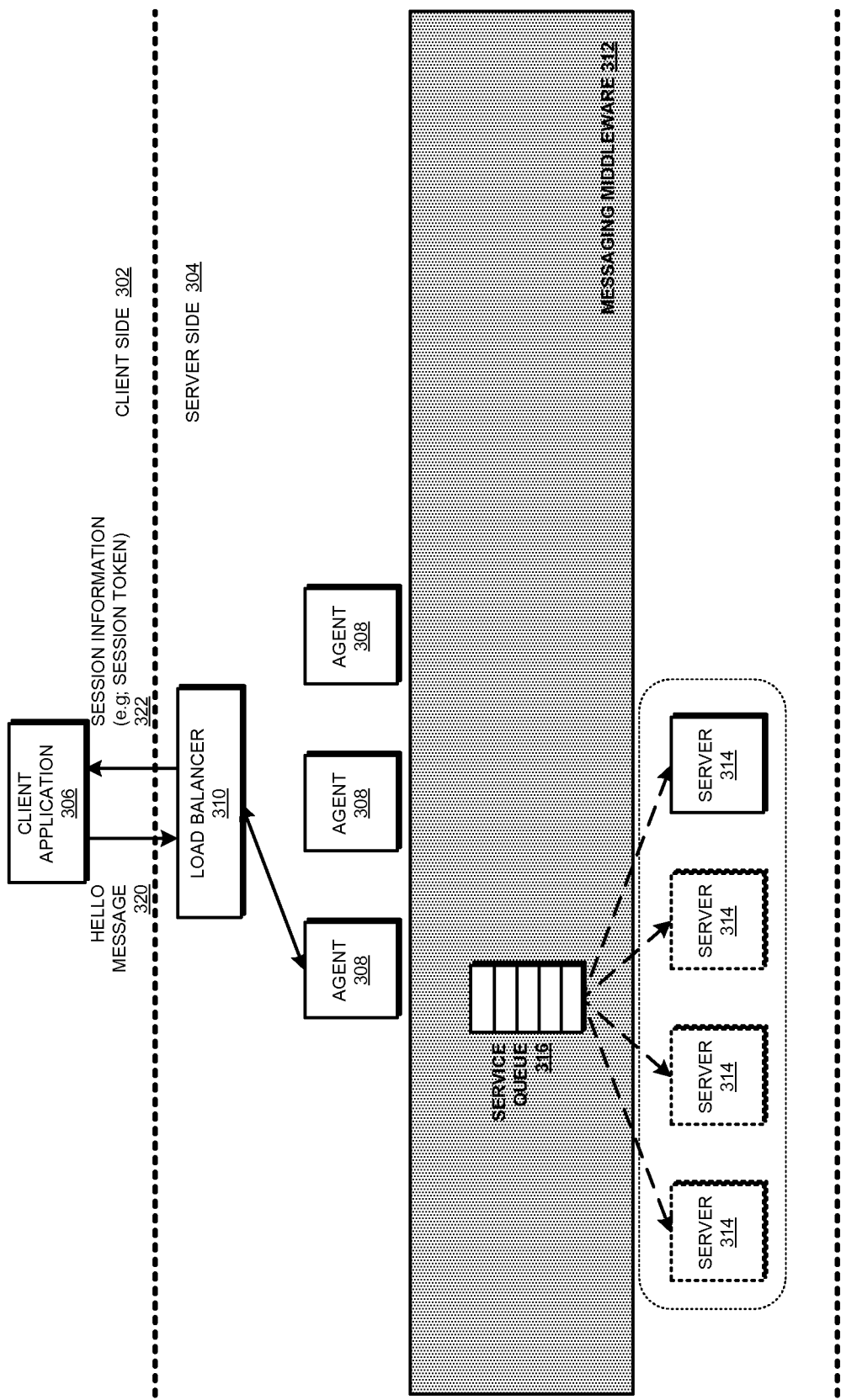
FIG. 3 depicts a block diagram of an example configuration for scalable and self-healing architecture for client-server operations in transient connectivity conditions in accordance with an illustrative embodiment.

With reference to FIG. 3, this figure depicts a block diagram of an example configuration for scalable and self-healing architecture for client-server operations in transient connectivity conditions in accordance with an illustrative embodiment. The dashed line dividing client-side 302 and server-side 304 represents a data network, such as network 102 in FIG. 1. Client-side 302 represents data requestors, such as client application 306. Client application 306 is an example of browser 134 or requestor application 115 in FIG. 1.

Server-side 304 represents the server-side data processing environment where backend applications and servers that respond to client requests, and other server-side architecture components to support their functions operate. A set of several agents 308 is depicted as an example. An instance of agent 308 is an example of agent 107 in FIG. 1. Load balancer 310 is an implementation of any suitable distribution method to distribute the inbound requests from client-side 302 amongst several agents 308. If only one agent 308 is deployed, load balancer 310 can be omitted. Load balancer 310 may also implement protocol termination or other such functions.

Messaging middleware 312 is an example of messaging middleware 111 in FIG. 1. Servers 314 are a set of servers, server applications, or backend applications that provide a particular service requested in some client requests. For example, server 314 may operate as redundant or load-sharing servers to provide a database service. Other sets of servers (not shown) may similarly be configured on server-side 304 to provide other services.

Service queue 316 holds those client requests that request the service provided by server 314. For example, client application 306 and other client applications (not shown) may send requests for data from a database. An agent from agents 308 receives one such request, identifies the requested service, determines that service queue 316 is associated with the requested service, and posts the request in service queue 316. Servers 314 subscribe to service queue 316. A server from servers 314 detects the posting of the request to service queue 316, and removes that request from service queue 316 for processing.

Note that each of servers 314 operates in a stateless manner. In other words, a server in servers 314 does not maintain any session or state information to have any particular affinity with any particular client application or a session. A server in servers 314 simply receives a request from service queue 316 and processes the request. The received request can be from any client application executing in any client data processing system using any session identifier.

In operation, client application 306 begins by sending a handshake message, e.g., Hello message 320 to server-side 304. Load balancer 310 receives message 320 and allocates message 320 to one of agents 308 as shown. Selected agent 308 receives message 320 and returns session identifier 322, e.g., a session token, to client application 306 via load balancer 310 or a security application such as a proxy server (not shown). Client application 306 is expected to use session identifier 322 in all future requests within the session with server-side 304.

Figure 4:
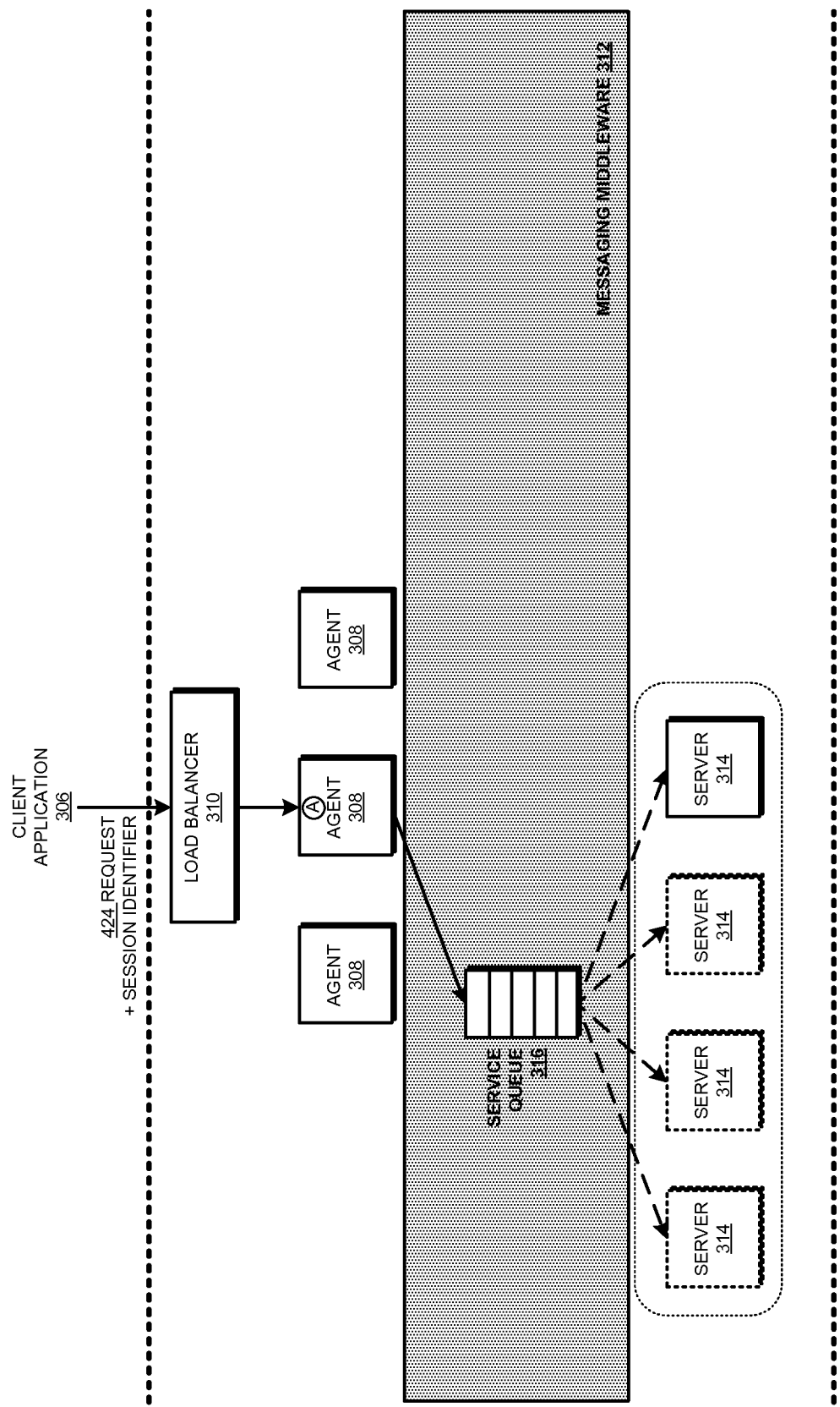
FIG. 4 depicts a block diagram of an operation using an example configuration for scalable and self-healing architecture for client-server operations in transient connectivity conditions in accordance with an illustrative embodiment.

With reference to FIG. 4, this figure depicts a block diagram of an operation using an example configuration for scalable and self-healing architecture for client-server operations in transient connectivity conditions in accordance with an illustrative embodiment. Depicted artifacts with reference numerals 306, 308, 310, 312, 314, and 316 are the same artifacts as described with respect to FIG. 3.

Having obtained session identifier 322, e.g., a session token in the operation described with respect to FIG. 3, client application 306 now sends request 424, which uses the session identifier. Load balancer 310 receives request 424 and sends request 424 to one of agents 308. Note that the instance of agent 308 receiving request 424 need not be the same instance that received Hello message 320 in FIG. 3.

Agent 308 that receives request 424, labeled "agent A", validates request 424. For example, agent A determines whether client application 306 is entitled to send request 424, a user credential used with request 424 is authorized to use request 424 or a result thereof, or perform some combination of these or other authentication or validation determinations.

Agent A identifies the service requested in request 424. For example, agent A examines a header of request message 424 to identify a message type identifier or a service type identifier, which informs agent A about the service being requested in message 424. Agent A may consult a lookup service (not shown in the figure) to map the service in the client request to the service that must be contacted, that has the associated service queue 316.

Agent A determines that service queue 316 is associated with the requested service. Agent A posts message 424 in service queue 316. Servers 314 provide the requested service and subscribe to service queue 316. A server from servers 316 removes message 424 for processing and providing the requested service.

Figure 5:
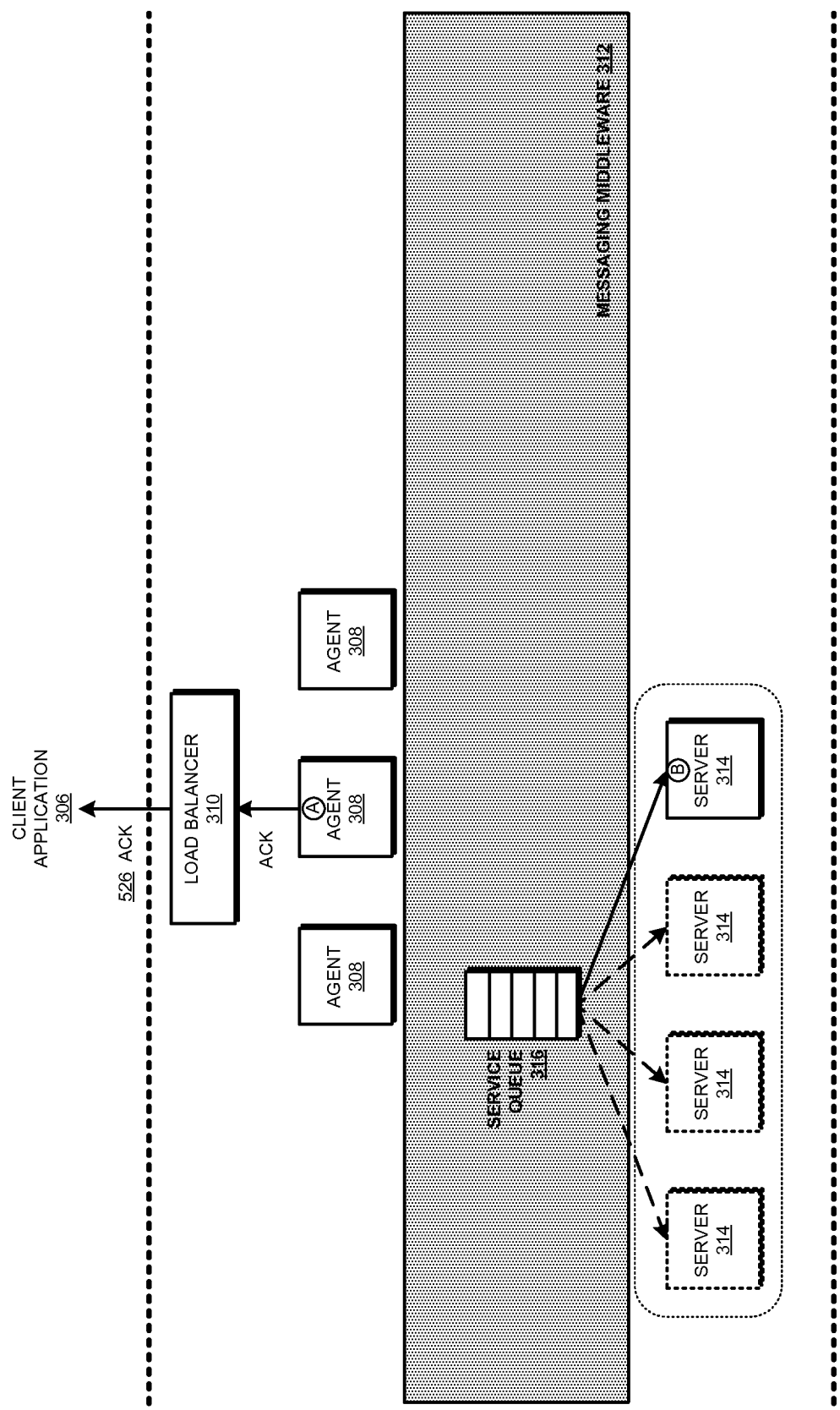
FIG. 5 depicts a block diagram of another operation using an example configuration for scalable and self-healing architecture for client-server operations in transient connectivity conditions in accordance with an illustrative embodiment.

With reference to FIG. 5, this figure depicts a block diagram of another operation using an example configuration for scalable and self-healing architecture for client-server operations in transient connectivity conditions in accordance with an illustrative embodiment. Depicted artifacts with reference numerals 306, 308, 310, 312, 314, and 316 are the same artifacts as described with respect to FIG. 3.

Having received request 424 in FIG. 4, agent A sends acknowledgement message 526, e.g., an ACK message" to client application 306. In a significant majority of cases, the sending of acknowledgement message 526 occurs faster than the time it takes a server 314 to process request 424. Acknowledgement message 526 reaches client application 306 via load balancer 310 or another security mechanism (not shown).

Meanwhile an instance of servers 314, labeled "server B" receives request 424 from service queue 316. Server B begins processing request 424.

Figure 6:
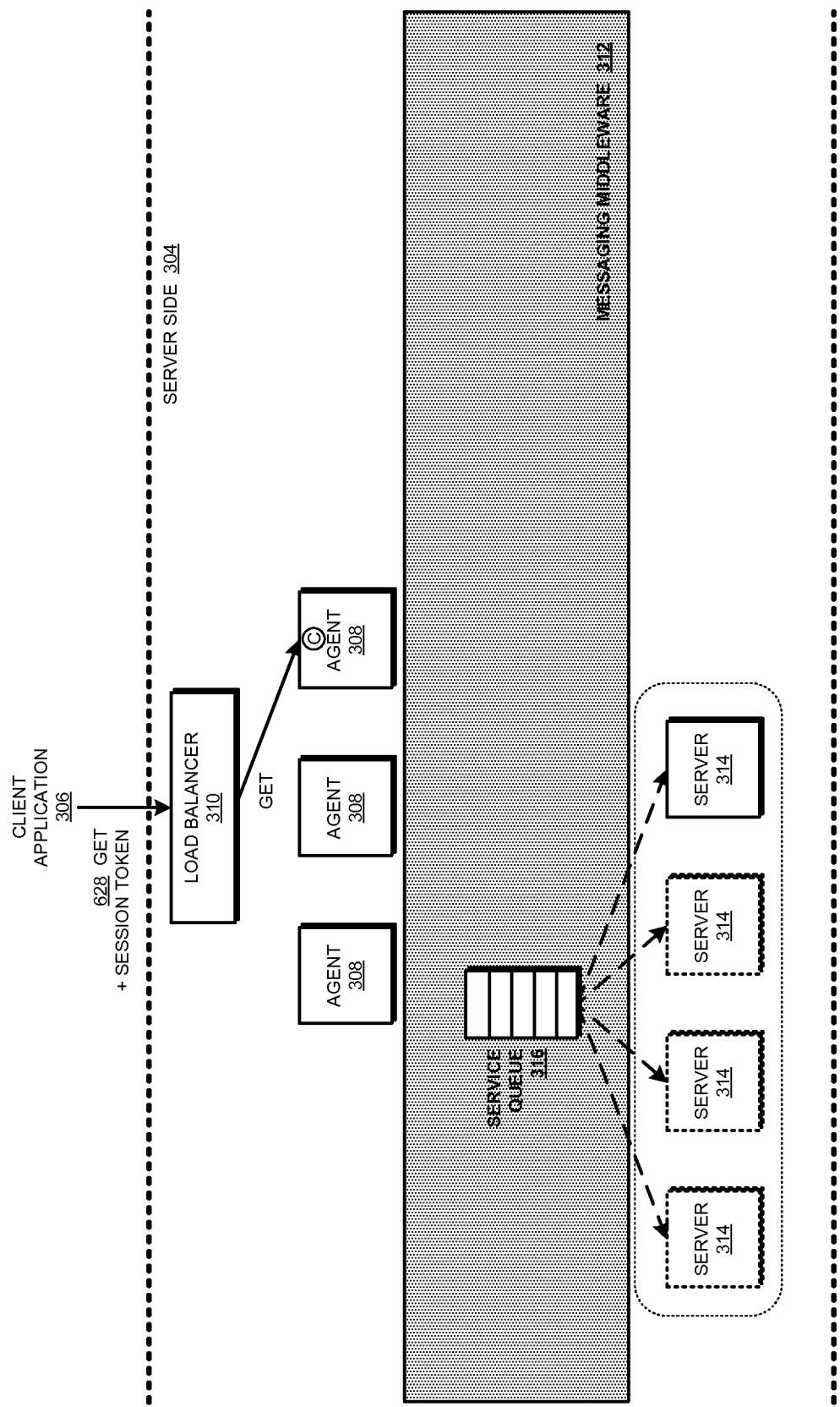
FIG. 6 depicts a block diagram of another operation using an example configuration for scalable and self-healing architecture for client-server operations in transient connectivity conditions in accordance with an illustrative embodiment.

With reference to FIG. 6, this figure depicts a block diagram of another operation using an example configuration for scalable and self-healing architecture for client-server operations in transient connectivity conditions in accordance with an illustrative embodiment. Depicted artifacts with reference numerals 306, 308, 310, 312, 314, and 316 are the same artifacts as described with respect to FIG. 3.

Having received acknowledgement message 526 in FIG. 5, client application 306 completes the request 424-response 526 pair, and need not resend request 424 even if network connectivity is lost. At some point in time, client application 306 opens a channel with server-side 304, e.g., by sending http Get message 628. Message 628 includes the session identifier obtained by client application 306 in FIG. 3.

Load balancer 310 distributes request 628 to an instance of agent 307, labeled "agent C". Note that the agent C that receives Get request 628 need not be, but can be, the same instance that received request message 424 in FIG. 4 or the instance Hello message 320 in FIG. 3.

Figure 7:
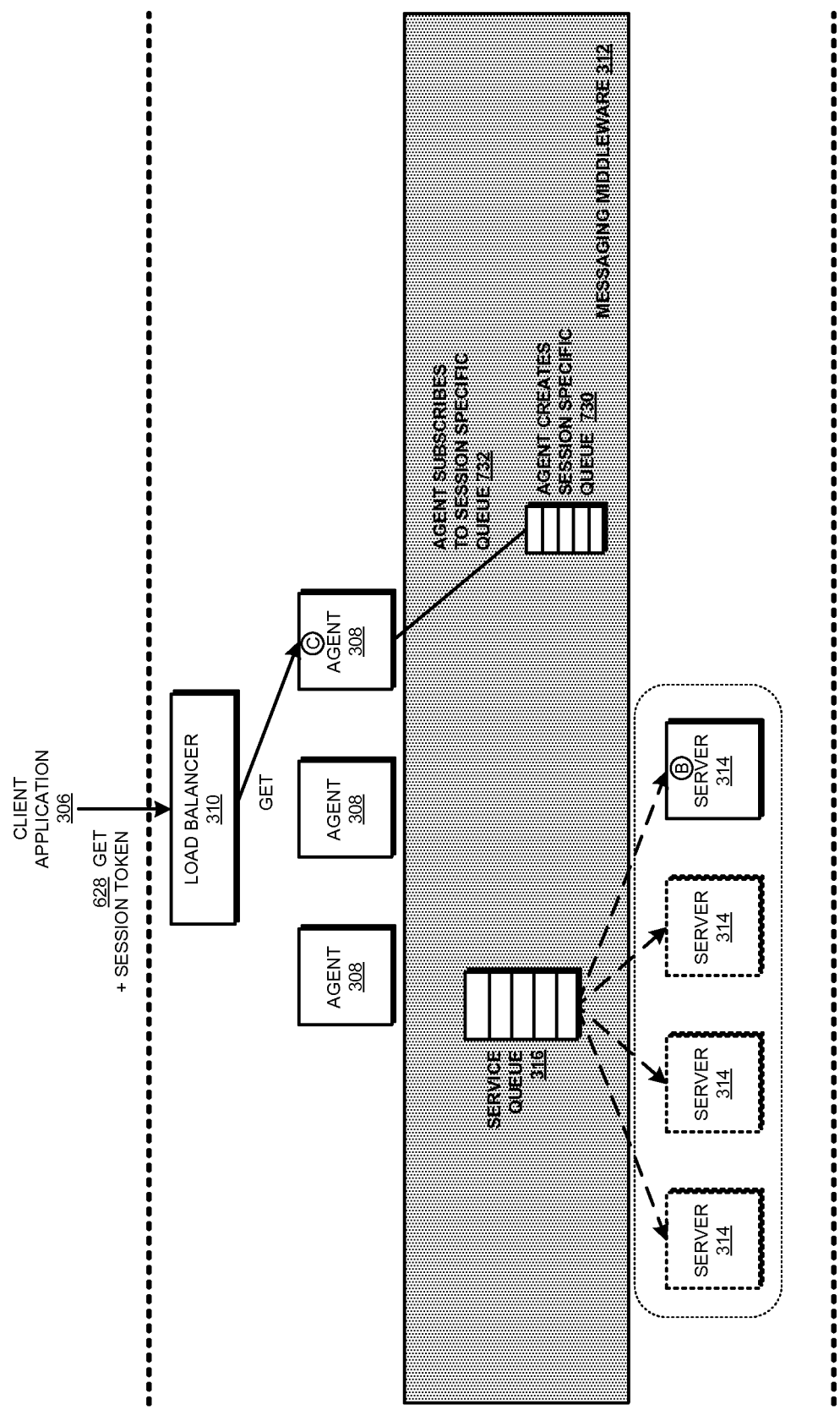
FIG. 7 depicts a block diagram of another operation using an example configuration for scalable and self-healing architecture for client-server operations in transient connectivity conditions in accordance with an illustrative embodiment.

With reference to FIG. 7, this figure depicts a block diagram of another operation using an example configuration for scalable and self-healing architecture for client-server operations in transient connectivity conditions in accordance with an illustrative embodiment. Depicted artifacts with reference numerals 306, 308, 310, 312, 314, and 316 are the same artifacts as described with respect to FIG. 3.

Having received GET message 628 in FIG. 6, agent C determines whether a channel is already open for client application 306 for the session associated with the session identifier 322 in FIG. 3. Agent C accomplishes this determination by checking whether session specific queue 730 already exists for the session with client application 306. Session specific queue 730 would already exist if client application 306 had previously sent another GET request that reached agent C or another instance of agent 308, which created session specific queue 730.

If session specific queue 730 does not exist, agent C creates session specific queue 730 in messaging middleware 312. In operation 732, agent C subscribes to, or binds with, session specific queue 730. By subscribing to, or binding with, session specific queue 730, agent C can detect or be notified when an instance of servers 314 posts a response to session specific queue 730.

Figure 8:
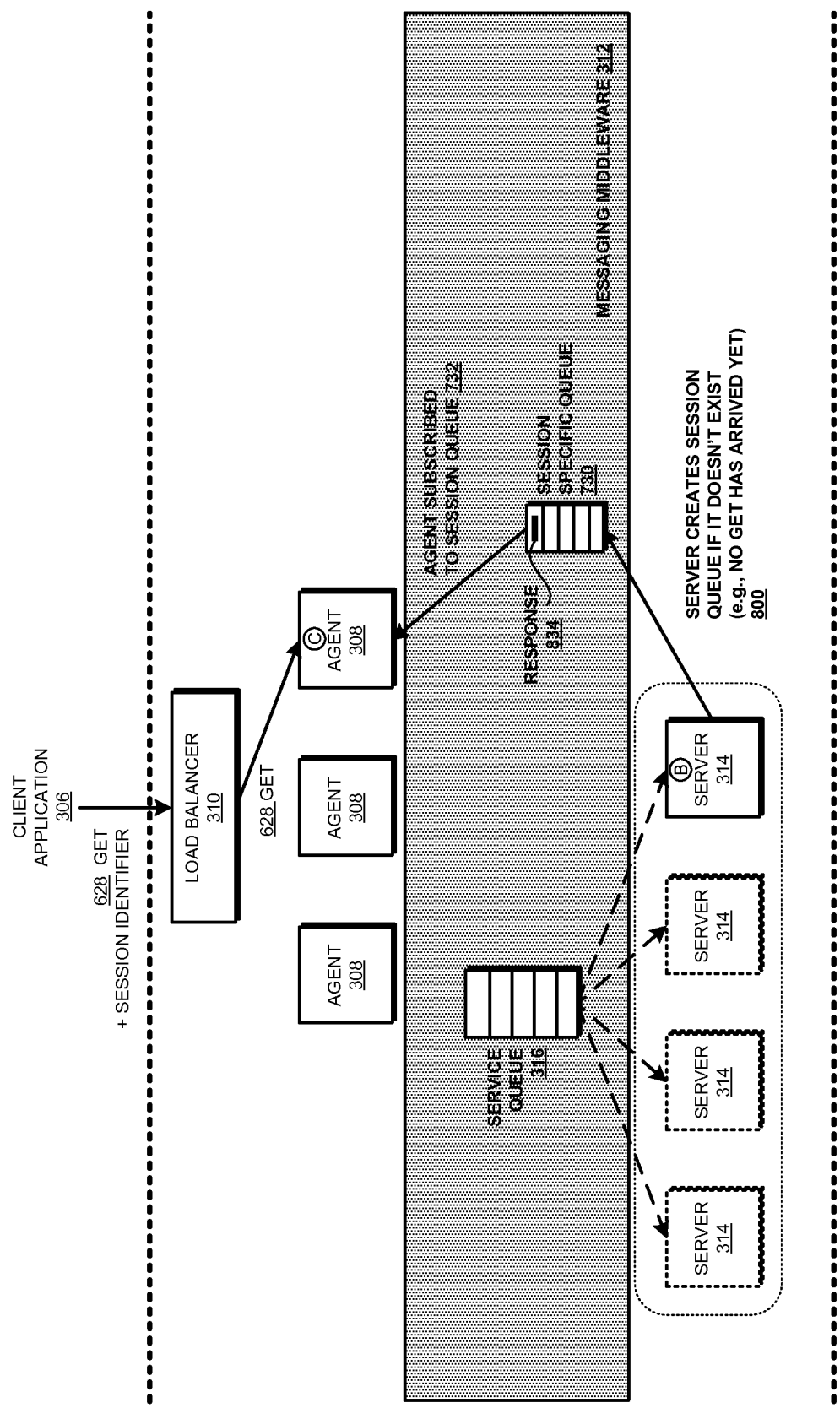
FIG. 8 depicts a block diagram of another operation using an example configuration for scalable and self-healing architecture for client-server operations in transient connectivity conditions in accordance with an illustrative embodiment.

With reference to FIG. 8, this figure depicts a block diagram of another operation using an example configuration for scalable and self-healing architecture for client-server operations in transient connectivity conditions in accordance with an illustrative embodiment. Depicted artifacts with reference numerals 306, 308, 310, 312, 314, and 316 are the same artifacts as described with respect to FIG. 3.

Having retrieved request 424 from service queue 316 for processing, server B produces response 834. Server B determines whether session specific queue 730 already exists for the session in which request 424 was made. If session specific queue 730 exists, such as when GET message 628 has already arrived and agent C has already created session specific queue 730, server B posts response 834 in session specific queue 730. If session specific queue 730 does not exist, server B creates session specific queue 730. In this manner, the queuing of server response 834 for delivery to the client and the GET request(s) from the client seeking any responses are decoupled.

Due to agent C's subscription 732 to session specific queue 730, agent C receives notification that response 834 has been posted in session specific queue 730 for the session with session identifier 322 for client 306.

Figure 9:
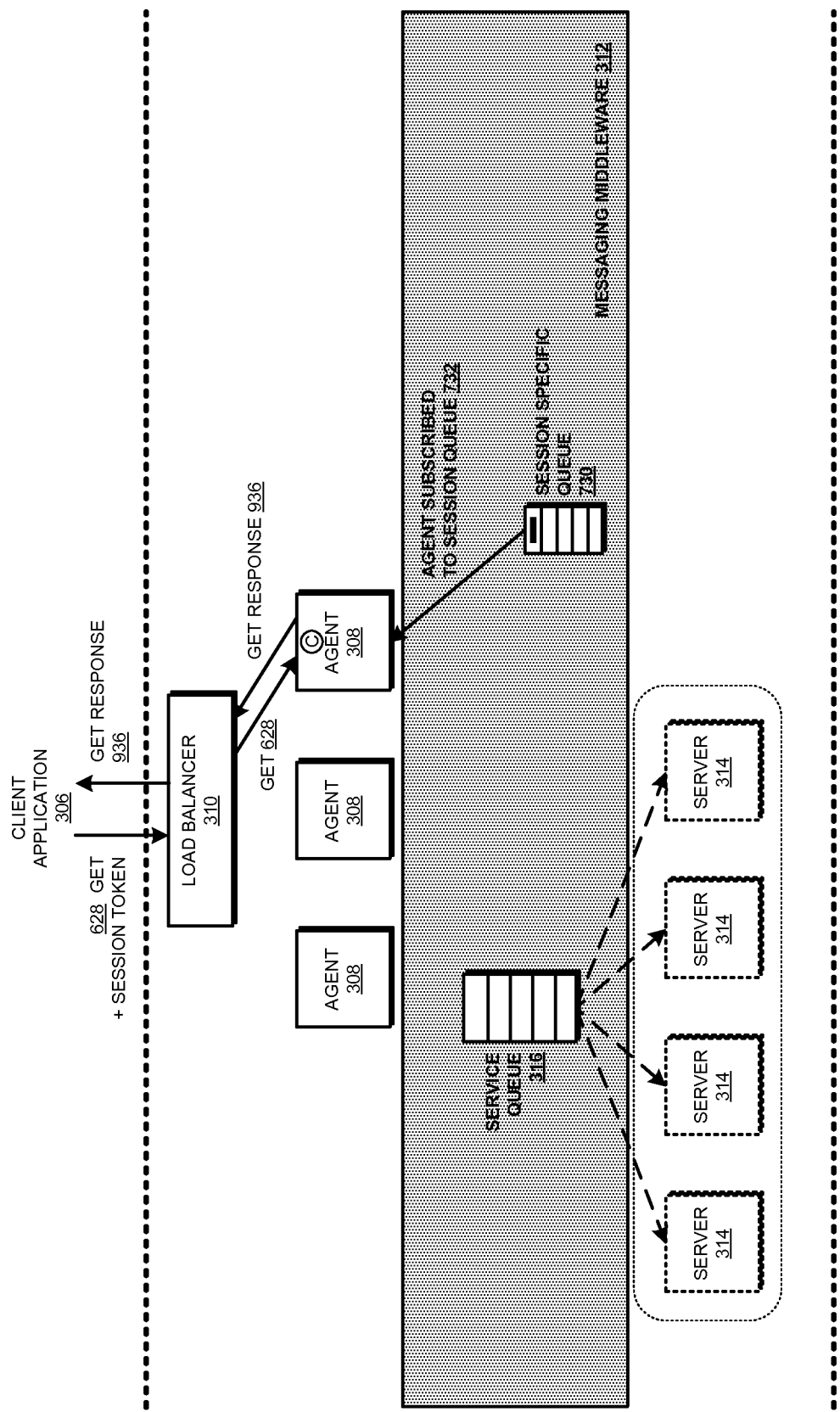
FIG. 9 depicts a block diagram of another operation using an example configuration for scalable and self-healing architecture for client-server operations in transient connectivity conditions in accordance with an illustrative embodiment.

With reference to FIG. 9, this figure depicts a block diagram of another operation using an example configuration for scalable and self-healing architecture for client-server operations in transient connectivity conditions in accordance with an illustrative embodiment. Depicted artifacts with reference numerals 306, 308, 310, 312, 314, and 316 are the same artifacts as described with respect to FIG. 3.

Having been notified of the posting of response 834, agent C retrieves response 834 from session specific queue 730. Because agent C has a channel open with client application 306 owing to GET request 628, agent C sends response 834 as GET response 936 to client application 306. Agent C sends Get response 936 through load balancer 310 or another security mechanism (not shown).

Figure 10:
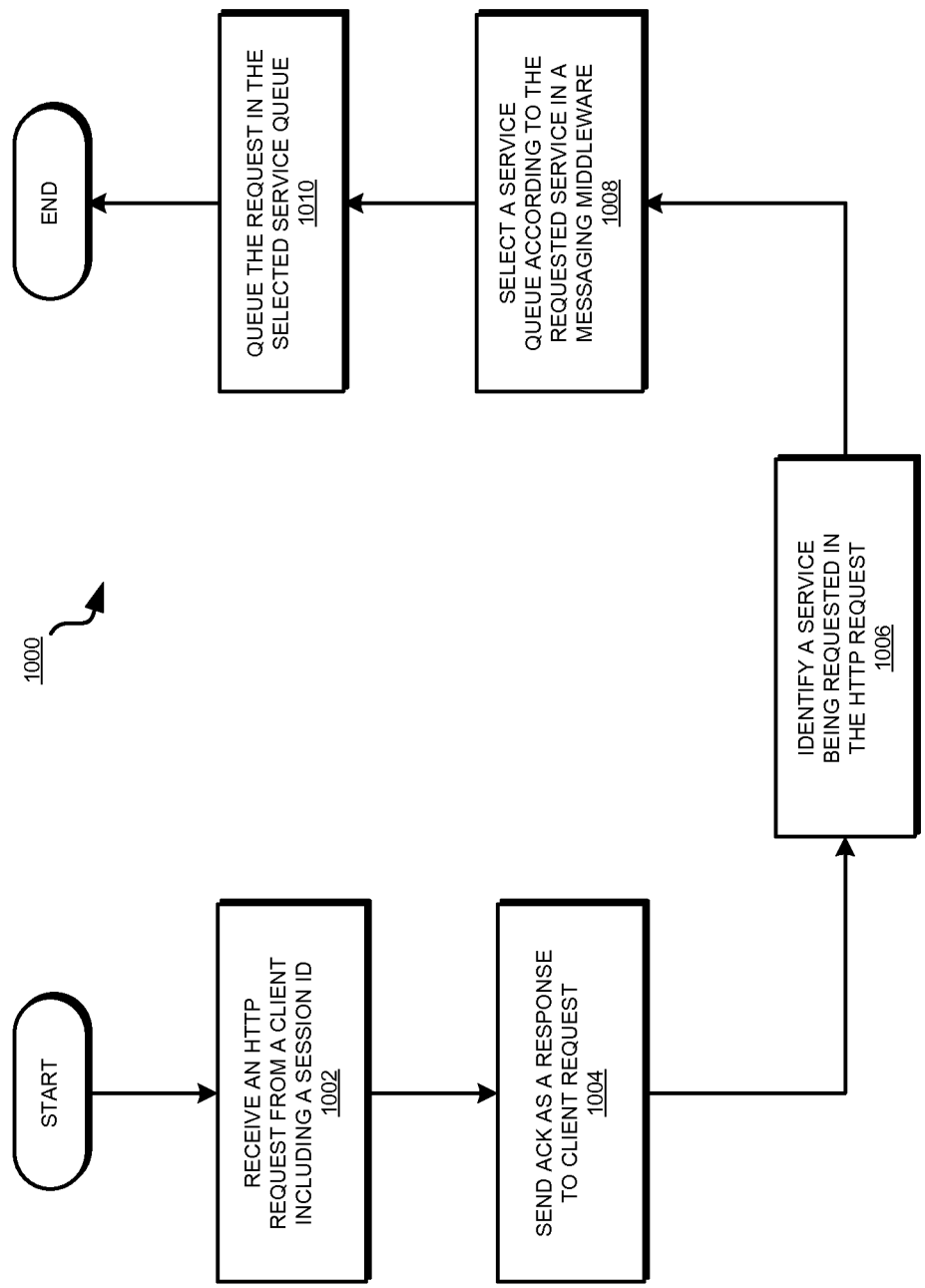
FIG. 10 depicts a flowchart of an example process for scalable and self-healing architecture for client-server operations in transient connectivity conditions in accordance with an illustrative embodiment.

With reference to FIG. 10, this figure depicts a flowchart of an example process for scalable and self-healing architecture for client-server operations in transient connectivity conditions in accordance with an illustrative embodiment. Process 1000 can be implemented in an agent application, such as in agent 308 in FIGS. 3-9.

An agent instance receives a request, e.g., an http request for data, for a client (block 1002). The request includes a session identifier that has been previously established by the same or different agent instance during a handshake messaging with the client.

The agent instance sends an acknowledgement response for the request to the client (block 1004). The acknowledgement is sent faster than an actual response containing the requested data, and causes the client to be notified that its request has been received by the backend.

The agent instance identifies and selects a service requested in the request (block 1006). The agent instance selects the service queue that corresponds to the requested service (block 1008). This determination may be made by simply selecting a client-specified service or by consulting another backend lookup service that maps the client requested service to a backend service specific to that client or class of clients (not shown). The agent instance queues the request message in the selected service queue (block 1010). The agent instance ends process 1000 thereafter.

Figure 11:
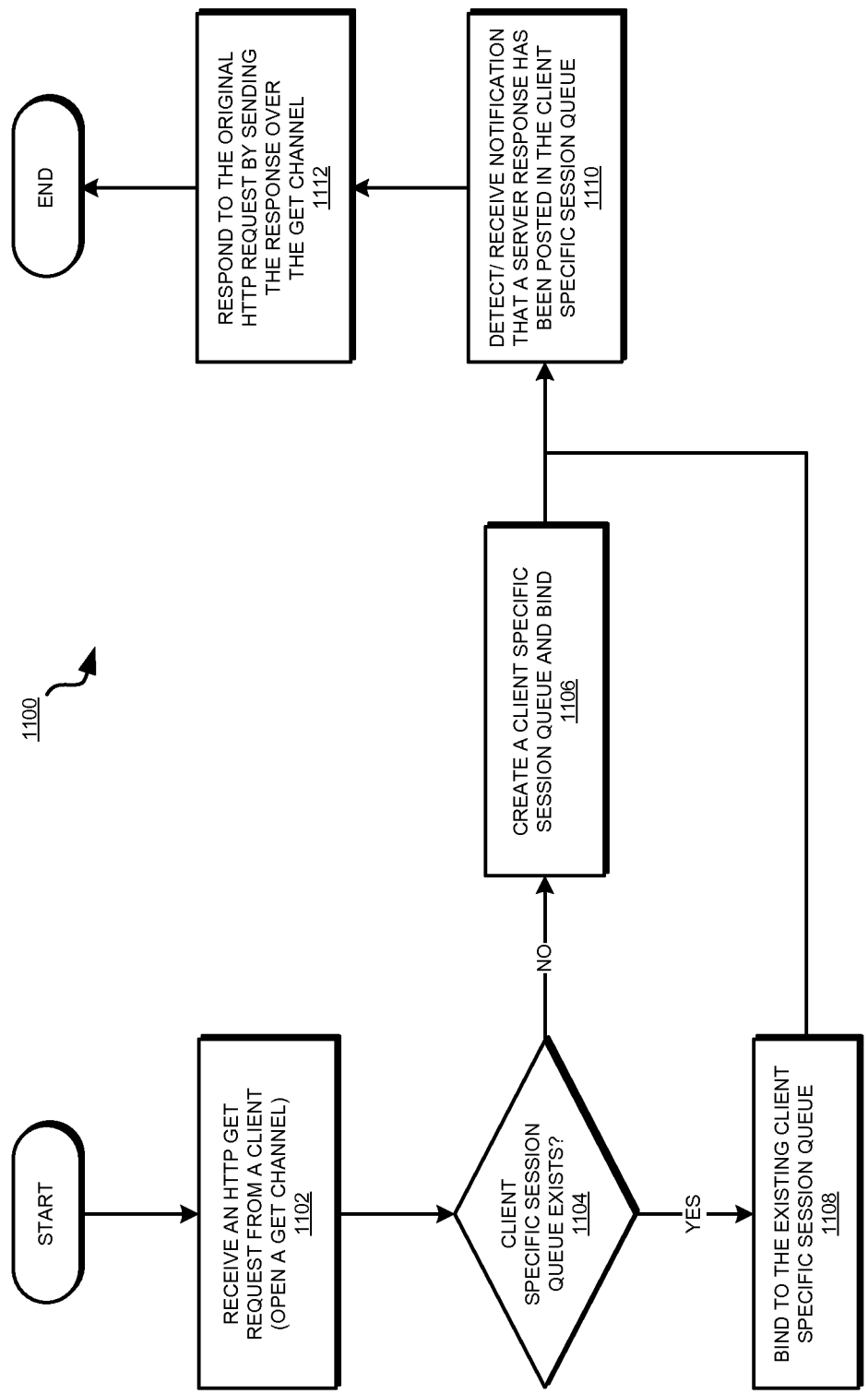
FIG. 11 depicts a flowchart of another example process for scalable and self-healing architecture for client-server operations in transient connectivity conditions in accordance with an illustrative embodiment.

With reference to FIG. 11, this figure depicts a flowchart of another example process for scalable and self-healing architecture for client-server operations in transient connectivity conditions in accordance with an illustrative embodiment. Process 1100 can be implemented in an agent application, such as in agent 308 in FIGS. 3-9.

An agent instance receives a request, such as an http GET request, which opens a channel between the client and the server-side, and through which the data requested by the request of block 1002 in FIG. 10 can be returned (block 1102). The agent instance that receives the request of block 1102 can be, but need not be, the same agent instance that received the request of block 1002 in FIG. 10.

The agent instance that receives the request of block 1102 determines whether a session specific queue exists for the session in which the request of block 1102 is sent (block 1104). If the session specific queue does not exist ("No" path of block 1104), the agent instance creates the session specific queue and binds with the newly created session specific queue (block 1106). If the session specific queue exists ("Yes" path of block 1104), the agent instance binds with the existing session specific queue (block 1108).

The agent instance detects, or receives notification from the messaging middleware, that a server response to the request of block 1002 of FIG. 10 has been posted in the session specific queue (block 1110). The agent instance responds to the original request, to wit, the request of block 1002, in the form of a GET response to the message of block 1102, over the open channel (block 1112). In other words, the GET response supplies to the client the data that the client had requested in the request of block 1002. The agent instance ends process 1100 thereafter.

With reference to FIG. 12, this figure depicts a flowchart of another example process for scalable and self-healing architecture for client-server operations in transient connectivity conditions in accordance with an illustrative embodiment. Process 1200 can be implemented in a server application, such as in server 314 in FIGS. 3-9.

The server instance creates a response to an original request message, e.g., the request of block 1002 in FIG. 10 (block 1202). The server instance in the combination determines whether a session specific queue exists for the session in which the request of block 1002 is sent (block 1204). If the session specific queue does not exist ("No" path of block 1204), the server instance creates the session specific queue and posts the response in the newly created session specific queue (block 1206). If the session specific queue exists ("Yes" path of block 1204), the server instance posts the response in the existing session specific queue (block 1208). The combination of the agent instance and the server instance ends process 1200 thereafter.

The illustrative embodiments have been described using examples of messages under HTTP only for the clarity of the description and not as a limitation on the illustrative embodiments. From this disclosure, those of ordinary skill in the art will recognize that the illustrative embodiments described herein are agnostic to the specific transport protocol used to communicate requests and responses between clients and servers, and can be adapted to operate with protocols other than HTTP, and the same is contemplated within the scope of the illustrative embodiments.

Thus, a computer implemented method, system or apparatus, and computer program product are provided in the illustrative embodiments for scalable and self-healing architecture for client-server operations in transient connectivity conditions. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing data requests in transient network conditions, the method comprising:
    receiving a first client request from a client data processing system, over a data network, at an agent application executing using a processor and a memory in an agent data processing system, the first client request requesting data from a type of service;
    responding to the first client request with a first agent response, the first agent response comprising an acknowledgement message to acknowledge receiving the first client request at the agent application;
    identifying the type of service requested by the first client request based upon an identifier associated with the first client request;
    determining, by the agent application, responsive to the first client request, whether a service queue corresponding to the identified type of service exists for the first client request;
    creating, by the agent application, responsive to the agent application determining that the service queue does not exist, the service queue corresponding to the identified type of service for the first client request by consulting a lookup service specified as part of configuring a backend service, the lookup service mapping the identified type of service to the service queue;
    queuing the first client request in the service queue corresponding to the identified type of the service, to make the first client request available to a server data processing system that provides the type of the service;
    detecting a loss of connectivity between the client data processing system and the agent data processing system;
    purging, responsive to the loss of connectivity between the client data processing system and the agent data processing system exceeding a timeout period, the service queue corresponding to the first client request;
    receiving a notification that a server response from the server data processing system has been posted into a session specific queue, the session specific queue being a server-created queue responsive to the server data processing system detecting that the service queue has been purged, the server response being responsive to the first client request;
    detecting a restoration of connectivity between the client data processing system and the agent data processing system; and
    sending, in response to a second client request received from the client data processing system, an agent response, the agent response including the data from the server response posted in the session specific queue, the second client request comprising an HTTP Get request, the agent response responsive to the first client request such that the client data processing system does not have to retransmit the first client request responsive to the restoration of connectivity.

2. The method of claim 1, further comprising:
    detecting that a fourth response has been posted in the session specific queue;
    determining that the fourth response remained in the session specific queue for a message timeout period; and
    purging the fourth response from the session specific queue.

3. The method of claim 1, further comprising:
    identifying that the session specific queue exists for a session with the client data processing system;
    determining that the agent application has not received a communication from the client data processing system for a queue timeout period; and
    deleting the session specific queue.

4. The method of claim 1, further comprising:
    removing the server response from the session specific queue.

5. The method of claim 1, further comprising:
    receiving the second client request from the client data processing system, wherein the second client request opens a channel over which the agent response can be transmitted to the client data processing system.

6. The method of claim 5, further comprising:
    determining whether the session specific queue exists;
    creating, responsive to the session specific queue not existing, the session specific queue consequent to receiving the second client request; and
    subscribing to the session specific queue.

7. The method of claim 5, further comprising:
    determining whether the session specific queue exists;
    subscribing, responsive to the session specific queue existing, to the session specific queue.

8. The method of claim 1, further comprising:
    causing, by the responding, the client data processing system to complete a request-response pair using the first client request and the first agent response such that the client data processing system does not have to retransmit the first client request even though the client data processing system has not received the data in the first agent response.

9. The method of claim 1, further comprising:
    causing the responding to occur within a first time period from the first client request, wherein the first time period is shorter than a second time period from the first client request, the second time period being needed to provide the data requested in the first client request, and wherein the data network is available during the first time period but the data network becomes unavailable during the second time period.

10. The method of claim 1, further comprising:
sending, responsive to a handshake message from the client data processing system, from a second application to the client data processing system, a session identifier to establish a session with the client data processing system;
wherein the first client request comprises a Hypertext Transfer Protocol (HTTP) request in the session and uses the session identifier,
wherein the agent response comprises a response to the HTTP Get request.

11. The method of claim 1, wherein a second application receives the second client request, and wherein the agent application and the second application are instances of an agent application operating in a load sharing configuration.

12. The method of claim 1, wherein the lookup service performs the queuing of the first client request in the service queue corresponding to the backend service.

13. A computer usable program product comprising a computer readable storage device including computer usable code for managing data requests in transient network conditions, the computer usable code comprising:
computer usable code for receiving a first client request from a client data processing system, over a data network, at an agent application executing using a processor and a memory in an agent data processing system, the first client request requesting data from a type of service;
computer usable code for responding to the first client request with a first agent response, the first agent response comprising an acknowledgement message to acknowledge receiving the first client request at the agent application;
computer usable code for identifying the type of service requested by the first client request based upon an identifier associated with the first client request;
computer usable code for determining, by the agent application, responsive to the first client request, whether a service queue corresponding to the identified type of service exists for the first client request;
computer usable code for creating, by the agent application, responsive to the agent application determining that the service queue does not exist, the service queue corresponding to the identified type of service for the first client request by consulting a lookup service specified as part of configuring a backend service, the lookup service mapping the identified type of service to the service queue;
computer usable code for queuing the first client request in the service queue corresponding to the identified type of the service, to make the first client request available to a server data processing system that provides the type of the service;
computer usable code for detecting a loss of connectivity between the client data processing system and the agent data processing system;
computer usable code for purging, responsive to the loss of connectivity between the client data processing system and the agent data processing system exceeding a timeout period, the service queue corresponding to the first client request;
computer usable code for receiving a notification that a server response from the server data processing system has been posted into a session specific queue, the session specific queue being a server-created queue responsive to the server data processing system detecting that the service queue has been purged, the server response being responsive to the first client request;
computer usable code for detecting a restoration of connectivity between the client data processing system and the agent data processing system; and
computer usable code for sending, in response to a second client request received from the client data processing system, an agent response, the agent response including the data from the server response posted in the session specific queue, the second client request comprising an HTTP Get request, the agent response responsive to the first client request such that the client data processing system does not have to retransmit the first client request responsive to the restoration of connectivity.

14. The computer usable program product of claim 13, further comprising:
computer usable code for detecting that a fourth response has been posted in the session specific queue;
computer usable code for determining that the fourth response remained in the session specific queue for a message timeout period; and
computer usable code for purging the fourth response from the session specific queue.

15. The computer usable program product of claim 13, further comprising:
computer usable code for identifying that the session specific queue exists for a session with the client data processing system;
computer usable code for determining that the agent application has not received a communication from the client data processing system for a queue timeout period; and
computer usable code for deleting the session specific queue.

16. The computer usable program product of claim 13, wherein the computer usable code is stored in a computer readable storage device in a data processing system, and wherein the computer usable code is transferred over a network from a remote data processing system.

17. The computer usable program product of claim 13, wherein the computer usable code is stored in a computer readable storage device in a server data processing system, and wherein the computer usable code is downloaded over a network to a remote data processing system for use in a computer readable storage device associated with the remote data processing system.

18. A data processing system for managing data requests in transient network conditions, the data processing system comprising:
a storage device, wherein the storage device stores computer usable program code; and a processor, wherein the processor executes the computer usable program code, and wherein the computer usable program code comprises:
computer usable code for receiving a first client request from a client data processing system, over a data network, at an agent application executing using a processor and a memory in an agent data processing system, the first client request requesting data from a type of service;
computer usable code for responding to the first client request with a first agent response, the first agent response comprising an acknowledgement message to acknowledge receiving the first client request at the agent application;

computer usable code for identifying the type of service requested by the first client request based upon an identifier associated with the first client request;

computer usable code for determining, by the agent application, responsive to the first client request, whether a service queue corresponding to the identified type of service exists for the first client request;

computer usable code for creating, by the agent application, responsive to the agent application determining that the service queue does not exist, the service queue corresponding to the identified type of service for the first client request by consulting a lookup service specified as part of configuring a backend service, the lookup service mapping the identified type of service to the service queue;

computer usable code for queuing the first client request in the service queue corresponding to the identified type of the service, to make the first client request available to a server data processing system that provides the type of the service;

computer usable code for detecting a loss of connectivity between the client data processing system and the agent data processing system;

computer usable code for purging, responsive to the loss of connectivity between the client data processing system and the agent data processing system exceeding a timeout period, the service queue corresponding to the first client request;

computer usable code for receiving a notification that a server response from the server data processing system has been posted into a session specific queue, the session specific queue being a server-created queue responsive to the server data processing system detecting that the service queue has been purged, the server response being responsive to the first client request;

computer usable code for detecting a restoration of connectivity between the client data processing system and the agent data processing system; and computer usable code for sending, in response to a second client request received from the client data processing system, an agent response, the agent response including the data from the server response posted in the session specific queue, the second client request comprising an HTTP Get request, the agent response responsive to the first client request such that the client data processing system does not have to retransmit the first client request responsive to the restoration of connectivity.

* * * * *